(12) United States Patent
Noma

(10) Patent No.: US 7,008,704 B2
(45) Date of Patent: Mar. 7, 2006

(54) MAGNETORESISTANCE EFFECT FILM AND SPIN VALVE REPRODUCING HEAD

(75) Inventor: Kenji Noma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/368,749

(22) Filed: Feb. 18, 2003

(65) Prior Publication Data

US 2003/0224209 A1    Dec. 4, 2003

(30) Foreign Application Priority Data

Jun. 3, 2002    (JP)    ............... 2002-162020

(51) Int. Cl.
*G11B 5/127*    (2006.01)

(52) U.S. Cl. ............ 428/814; 428/815; 360/324.1; 360/324.12

(58) Field of Classification Search ........... 428/611, 428/636, 650, 651, 652, 655, 656, 660, 661, 428/662, 663, 664, 666, 668, 669, 670, 671, 428/672, 673, 674, 675, 676, 686, 692, 693; 360/324, 324.1
See application file for complete search history.

(56) References Cited

U.S. PATENT DOCUMENTS

| | | | | |
|---|---|---|---|---|
| 5,422,571 A | * | 6/1995 | Gurney et al. ........... 324/252 |
| 6,369,993 B1 | * | 4/2002 | Hayashi ................. 360/327.2 |
| 6,452,385 B1 | * | 9/2002 | Shimazawa et al. ...... 324/252 |
| 6,621,667 B1 | * | 9/2003 | He et al. .............. 360/324.12 |
| 6,663,986 B1 | * | 12/2003 | Sanders ................... 428/692 |
| 6,709,767 B1 | * | 3/2004 | Lin et al. ................. 428/611 |
| 2002/0023338 A1 | | 2/2002 | Seigler et al. .......... 29/603.15 |
| 2002/0024778 A1 | * | 2/2002 | Xue et al. .............. 360/324.1 |
| 2003/0133232 A1 | * | 7/2003 | Li et al. ................ 360/324.1 |
| 2003/0197983 A1 | * | 10/2003 | Horng et al. ........... 360/324.1 |

FOREIGN PATENT DOCUMENTS

EP    1 096 478    5/2001
WO    WO-02-077657 A1 * 10/2002

* cited by examiner

Primary Examiner—Kevin M. Bernatz
(74) Attorney, Agent, or Firm—Greer, Burns & Crain, Ltd.

(57) ABSTRACT

The spin valve reproducing head has a narrow track width and high stability. The spin valve reproducing head comprises: a base layer; a magnetoresistance effect film having a magnetic sensing section; biasing sections formed on both sides of the magnetoresistance effect film; terminal sections; an insulating layer covering said members; and an upper shielding layer formed on the insulating layer. The magnetoresistance effect film includes a fixed magnetic layer, a non-magnetic layer and a free magnetic layer piled in that order. And a non-magnetic electric conductive layer, whose resistivity is lower than that of the free magnetic layer, and an etching stop layer, whose sputtering rate is higher than that of tantalum and lower than that of copper, are piled on the free magnetic layer in that order.

3 Claims, 3 Drawing Sheets

MAGNETORESISTANCE EFFECT FILM AND SPIN VALVE REPRODUCING HEAD

BACKGROUND OF THE INVENTION

The present invention relates to a magnetoresitance effect film and a spin valve reproducing head.

In spin valve reproducing heads of a hard disk drive unit, high reproducing power, narrow core width and stable reproduction are required.

Conventional spin valve reproducing heads are shown in FIGS. 11–13.

A basic spin valve reproducing head called an abutted type head is shown in FIG. 11. The abutted type head includes: a magnetic sensing section 11 which is made of a spin valve film and whose width is equal to that of a track of a recording medium; biasing sections 13 which are made of hard magnetic layers so as to stably magnetize a free magnetic layer 12; and terminal sections 14 for supplying a sensing electric current to the magnetic sensing section 11. The biasing sections 13 are provided on the both sides of the magnetic sensing section 11, and they are magnetized, for example, rightward in the drawing. Magnetic fields leaked from the biasing sections 13 are applied to the magnetic sensing section 11 as biasing magnetic fields. The free magnetic layer 12 of the magnetic sensing section 11 is made of, for example, a soft magnetic layer whose magnetic coercive force is 50 e or less, and it is magnetized rightward in the drawing by the magnetic fields leaked from the biasing sections 13 or the hard magnetic layers. Therefore, even if no magnetic field is given from the recording medium, the free magnetic layer 12 can be magnetized in one direction. With this structure, variation of base lines of reproducing signals can be limited, and the signals can be stably reproduced.

These days, the width of the magnetic sensing section 11 is made narrower. In the case of the magnetic sensing section 11 whose width is 1 $\mu$m or less, it is difficult to stably reproduce signals due to unstable zones "A". Since the unstable zones "A" are separated away from the hard magnetic layers 13, the biasing magnetic fields are smaller than that of dead zones "B", in which the hard magnetic layers 13 are connected, and the unstable zones "A" cannot be completely magnetized in one direction. If the unstable zones "A" is diagonally magnetized with respect to the biasing magnetic fields, base lines of reproducing signals are varied, so that the signals cannot be stably reproduced.

FIG. 12 shows a terminal-overlay type head, and FIG. 13 shows an exchange bias type head. They have been developed to overcome the disadvantage of the abutted type head.

In the terminal-overlay head shown in FIG. 12, terminal sections 14, which supply a sensing current, overlay the unstable zones "A". With this structure, the sensing current runs between the terminal sections 14 only. Therefore, no current passes through the unstable zones "A". The zones, through which no sensing current passes, do not badly influence reproduction voltage, so that the unstable zones can be removed.

However, the terminal-overlay type head has a following disadvantage.

Namely, if width of the unstable zone "A" is, for example, 0.05 $\mu$m, preferable width of an overlaying part is 0.05 $\mu$m. But it is difficult to make such the narrow overlaying part without deviation by a conventional manner. Especially, if width of the sensing section 11 is 0.5 $\mu$m or less, it is highly difficult to make the head.

On the other hand, in the exchange bias type head, a biasing section 15, which is made of an antiferromagnetic film generating a switched connection, covers an end part of the free magnetic layer 12 without the hard magnetic layer 13 as shown in FIG. 13. A switched connection magnetic field directly magnetizes the free magnetic layer 12 in one direction, so that stable magnetizing can be executed. Unlike the abutted type head and the terminal-overlay head, the switched connection magnetic field is not influenced by a distance from the biasing section 15. Therefore, a great bias magnetic field is applied to a zone connected to the antiferromagnetic film 15, and the unstable zones can be removed, so that the free magnetic layer 12 can be stably magnetized.

A process of manufacturing the exchange bias type head will be explained with reference to FIGS. 1–8.

Firstly, a spin valve film 20 is formed (see FIG. 1), and a resist pattern 21 is formed on the spin valve film 20 by photolithography (see FIG. 2).

The spin valve film 20 is ion-milled or ion-etched with the resist pattern 21, which acts as a mask, so as to form into a trapezoid (see FIG. 3). The resist pattern 21 is once removed (see FIG. 4), and another resist pattern 22, whose width is defined by the width of the sensing section and narrower than that of the resist pattern 21 shown in FIG. 2, is formed by photolithography (see FIG. 5). Next, the spin valve film 20 is ion-milled to remove useless substances thereon. The antiferromagnetic film 15 is formed by sputtering (see FIG. 7), and the resist pattern 22 is removed (see FIG. 8).

The above described process is almost equal to a process of manufacturing the terminal-overlay type head.

Unlike the terminal-overlay type head, the free magnetic layer 12 of the exchange bias type head can be stably magnetized. However, the superior exchange bias type head has never been used as a reproducing head. The reason is that intensity of the switched connection magnetic field between the antiferromagnetic film 15 and the free magnetic layer 12 is low so that a sufficient bias magnetic field cannot be applied to the free magnetic layer 12. The inventor thinks that if the ion milling for removing the useless substances (see FIG. 6) is insufficient, a sufficient bias magnetic field cannot be applied to the free magnetic layer 12.

Metal tantalum (Ta) has been used as a surface protection layer for protecting the spin valve film 20. The reasons are: tantalum and tantalum oxides are highly chemically stable; and their resistivity ($\rho$) is high, e.g., 180 $\mu\Omega$m, so spin valve characteristics are not influenced even if thickness of the film is slightly varied.

However, in the step of manufacturing the exchange bias type head shown in FIG. 6, useless substances in the connecting part are removed by ion milling. In the step, if the protection layer for protecting the spin valve film 20 includes tantalum, the free magnetic layer 12, whose sputtering rate is 1.2–1.5, is partially sputter-removed before tantalum, whose sputtering rate is 0.62, is completely removed. Therefore, magnetic characteristics of the free magnetic layer 12 must be worse, and the intensity of the switched connection magnetic field must be lower. Further, if tantalum is partially left as residue, the switched connection between the antiferromagnetic film 15 and the free magnetic layer 12 must be weak.

SUMMARY OF THE INVENTION

An object of the present invention is to provide a spin valve reproducing head having a narrow track width and high stability and a method of manufacturing the same.

Another object is to provide a magnetoresistance effect film for said spin valve reproducing head.

To achieve the objects, the present invention has the following structures.

Firstly, the magnetoresistance effect film of the present invention comprises a fixed magnetic layer, a non-magnetic layer, and a free magnetic layer piled in that order, wherein a non-magnetic electric conductive layer, whose resistivity is lower than that of the free magnetic layer, and an etching stop layer, whose sputtering rate is higher than that of tantalum and lower than that of copper, are piled on the free magnetic layer in that order.

Another magnetoresistance effect film of the present invention comprises a fixed magnetic layer, a non-magnetic layer and a free magnetic layer piled in that order, characterized in that a non-magnetic electric conductive layer, whose resistivity is lower than that of the free magnetic layer, an etching stop layer, whose sputtering rate is higher than that of tantalum and lower than that of copper, and an oxidation-resistant metal layer are piled on the free magnetic layer in that order.

The spin valve reproducing head of the present invention comprises: a base layer including a lower shielding layer; a magnetoresistance effect film having a magnetic sensing section and being formed on the base layer; biasing sections being formed on both sides of the magnetoresistance effect film; terminal sections for supplying a sensing current to the magnetic sensing section; an insulating layer covering over the magnetoresistance effect film, the biasing sections and the terminal sections; and an upper shielding layer formed on the insulating layer, wherein the magnetoresistance effect film includes a fixed magnetic layer, a non-magnetic layer and a free magnetic layer piled in that order, and a non-magnetic electric conductive layer, whose resistivity is lower than that of the free magnetic layer, and an etching stop layer, whose sputtering rate is higher than that of tantalum and lower than that of copper, are piled on the free magnetic layer in that order.

Further, the method of manufacturing a spin valve reproducing head comprises the steps of: forming a base layer including a lower shielding layer; forming a magnetoresistance effect film having a magnetic sensing section and being formed on the base layer; forming biasing sections being formed on both sides of the magnetoresistance effect film; forming terminal sections for supplying a sensing current to the magnetic sensing section; forming an insulating layer covering over the magnetoresistance effect film, the biasing sections and the terminal sections; and forming an upper shielding layer formed on the insulating layer, characterized in that the magnetoresistance effect film is formed by piling at least a fixed magnetic layer, a non-magnetic layer, a free magnetic layer, a non-magnetic electric conductive layer whose resistivity is lower than that of the free magnetic layer, an etching stop layer whose sputtering rate is higher than that of tantalum and lower than that of copper, and an oxidation-resistant metal layer in that order, and that the insulating layer is formed after plasma cleaning, in which etching is stopped when the etching stop layer is exposed.

In the present invention, a great switched connection magnetic field can be generated in an exchange bias type reproducing head, and signals recorded in a narrow track can be stably reproduced. In a terminal-overlay type reproducing head too, the sensing current can be run between the terminal sections only, so that reproducing track width of the head can be narrower.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Figure 1:
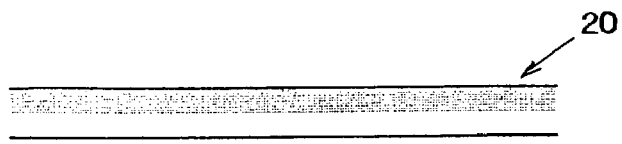
FIG. 1 is an explanation view of a spin valve film.
Figure 2:
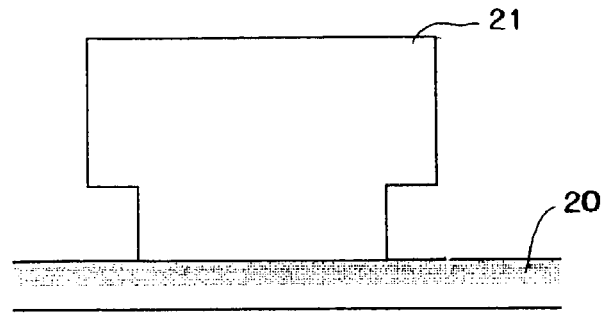
FIG. 2 is an explanation view of the step of forming a resist pattern.
Figure 3:
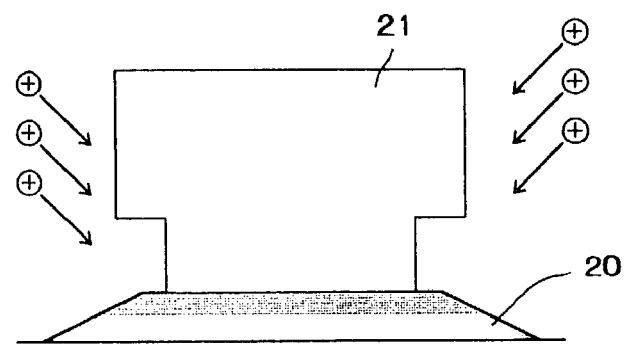
FIG. 3 is an explanation view of the step of executing ion milling with the resist pattern as a mask.
Figure 4:
FIG. 4 is an explanation view of the step of forming a magnetoresistance effect film into trapezoid.
Figure 5:
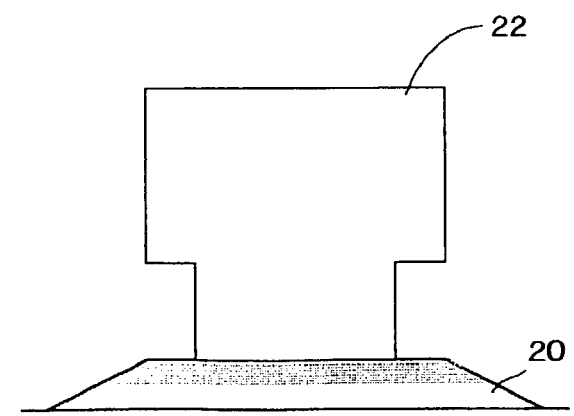
FIG. 5 is an explanation view of the step of forming another resist pattern.

Preferred embodiments of the present invention will now be described in detail with reference to the accompanying drawings.

In the present embodiment, a non-magnetic electric conductive layer, whose resistivity is lower than that of said free magnetic layer, an etching stop layer, whose sputtering rate is higher than that of tantalum and lower than that of copper, and an oxidation-resistant metal layer are piled on a free magnetic layer in that order as a protection layer. The protection layer is employed instead of the conventional protection layer including tantalum.

By employing the three-layered protection layer, residue of ion milling can be completely removed. Therefore, an exchange bias type reproducing head can be realized.

By the non-magnetic electric conductive layer having low resistivity is used, variation of amount of etching or ion milling does not badly influence characteristics of an element. If the free magnetic layer 12 is directly ion-milled or directly plasma-cleaned before forming an insulating film, magnetic characteristics and magnetoresistance effect of the free magnetic layer 12 are badly influenced. To solve the problem, an intermediate layer is formed between the etching stop layer, which will be partially removed by ion milling or plasma cleaning, and the free magnetic layer. In the terminal-overlay type head and the exchange bias type head, if the intermediate layer is made of a material whose resistivity is lower than that of the free magnetic layer 12, a sensing electric current can be run between terminals only, so that reproducing track width can be narrower; if the intermediate layer is made of a material whose resistivity is higher than that of the free magnetic layer 12, the sensing current runs through overlaid terminals and a part under an exchange layer, so that the reproducing track width must be wider. To achieve the object of the present invention or to realize the reproducing head having the narrow reproducing track width, the resistivity of the intermediate layer should be lower. Further, the intermediate layer must be a non-magnetic layer so as not to badly influence magnetizing of the free magnetic layer 12. Therefore, the intermediate layer is made of copper, silver, gold and their alloy (see TABLE 1).

TABLE 1

| Material | Resistivity | Material | Resistivity |
|---|---|---|---|
| Ag | 1.62 | Fe | 9.8 |
| Al | 2.65 | Ni | 6.9 |
| $Al_2O_3$ | — | Pd | 10.4 |
| Au | 2.2 | Pt | 10.6 |
| Co | 7.0 | Ru | 7.46 |
| Cr | 18.9 | β-Ta | 180 |
| Cu | 1.72 | $Ta_2O_5$ | — |

The etching stop layer should have relatively low etching rate so as not to etch the non-magnetic electric conductive layer, which has low resistivity, while plasma cleaning. The etching rate correlates with the sputtering rate, so the etching rate can be known on the basis of the sputtering rate. TABLE 2 shows sputtering rate of a simple metal sputtered with argon ions whose energy is 600 eV. The sputtering rate of non-magnetic electric conductive metals having low resistivity are Cu: 2.30, Ag: 3.40, and Au: 2.43, therefore the etching stop layer is preferably made of a material whose sputtering rate is lower than that of said non-magnetic electric conductive metals. According to the TABLE 2, the preferable metals are Al, Co, Cr, Fe, Ni, Pt and Ru. The sputtering rate of $Al_2O_3$, Ta and $Ta_2O_5$ are also low, but they will be left as residue by ion milling and no switched connection magnetic field will be generated. So they are improper metals. Therefore, the preferable sputtering rate of the etching stop layer is higher than that of Ta and lower than that of Cu. According to the TABLE 2, the preferable range of the sputtering rate is 0.62–2.30.

If the etching stop layer is oxidized in the air, the sputtering rate is made lower, so the oxidation-resistant layer is formed to prevent oxidization. For example, gold, silver, platinum, palladium and their alloy may be employed as the oxidation-resistant layer. Preferably, the sputtering rate of the oxidation-resistant layer is higher than that of the etching stop layer. The sputtering rate of said metals are higher than that of the etching stop layer. Note that, platinum may act as the non-magnetic electric conductive layer.

TABLE 2

| Material | Sputtering Rate | Material | Sputtering Rate |
|---|---|---|---|
| Ag | 3.40 | Fe | 1.26 |
| Al | 1.24 | Ni | 1.52 |
| $Al_2O_3$ | 0.18 | Pd | 2.39 |
| Au | 2.43 | Pt | 1.56 |
| Co | 1.36 | Ru | 1.30 |
| Cr | 1.30 | β-Ta | 0.62 |
| Cu | 2.30 | $Ta_2O_5$ | 0.15 |

Concrete examples will be explained.

An alumina layer, whose thickness is several μm, is formed on an alumina substrate (wafer), to which titanium carbide has been added, as an insulating layer. Then, a permalloy layer, whose thickness is several μm, is formed as a lower shielding layer. Next an alumina layer, whose thickness is about 0.03 μm, is formed as a gap layer then a spin valve film is formed thereon. For example, the structure of the spin valve film is NiCr 6 nm/PtMn 20 nm/CoFe 2 nm/Cu 2 nm/CoFe 1 nm/NiFe 4 nm/Au 0.5 nm/NiCr 2 nm/Au 1 nm. The film is formed by continuous sputtering.

Figure 10:
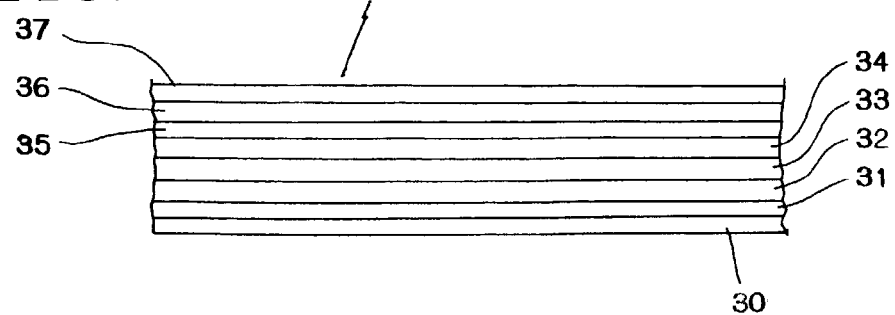
FIG. 10 is an explanation view of a spin valve film.
Figure 11:
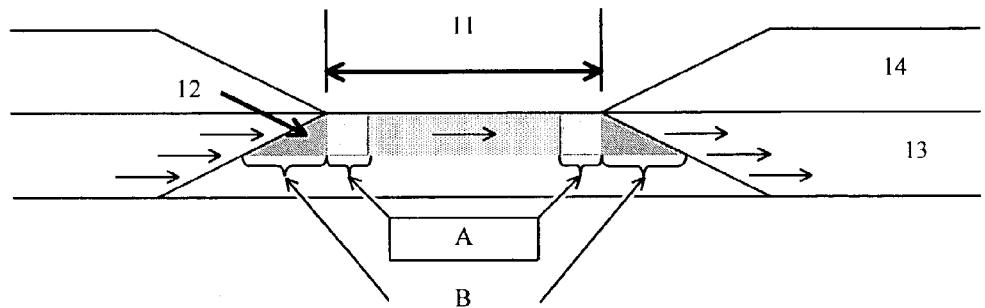
FIG. 11 is a sectional view of abutted type spin valve element.
Figure 12:
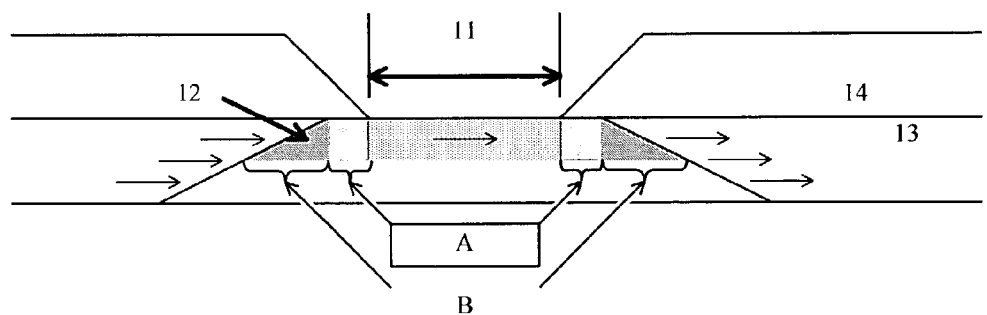
FIG. 12 is a sectional view of a terminal-overlay type spin valve element.
Figure 13:
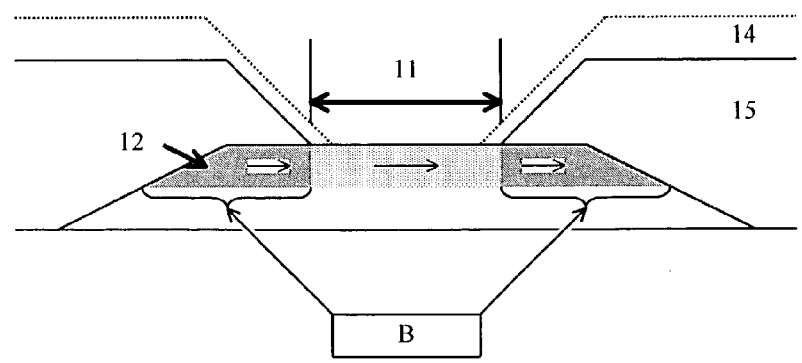
FIG. 13 is a sectional view of an exchange bias type spin valve element.

The structure of the spin valve film 20 is shown in FIG. 10.

A base layer 30 is NiCr 6 nm; an antiferromagnetic layer 31 is PtMn 20 nm; a fixed magnetic layer 32 is CoFe 2 nm; a non-magnetic layer 33 is Cu 2 nm; and a free magnetic layer 34 is CoFe 1 nm/NiFe 4 nm. A protection layer is Au 0.5 nm/NiCr 2 nm/Au 1 nm, in which a non-magnetic electric conductive layer 35 is Au 0.5 nm; an etching stop layer 36 is NiCr 2 nm; and an oxidation-resistant layer 37 is Au 1 nm.

The layer of Au 0.5 nm may be Cu or Ag 0.5 nm. The layer of NiCr 2 nm may be Al, Cr or Ru 2 nm. Further, the layer of Au 1 nm may be Ag 1 nm. The spin valve film 20 is heat-treated in a magnetic field, by a known manner, so as to switch-connect the PtMn layer and the CoFe layer of 2 nm.

Figure 6:
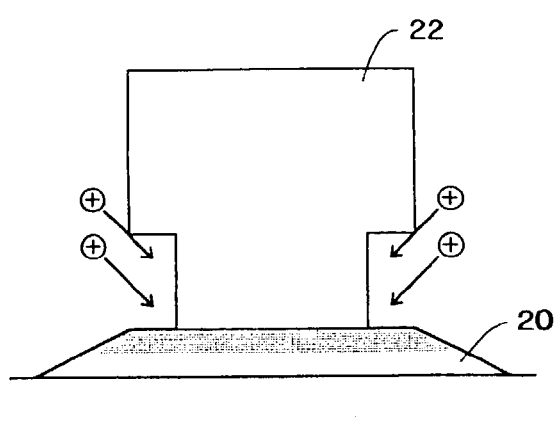
FIG. 6 is an explanation view of the step of ion-milling a connecting part.
Figure 7:
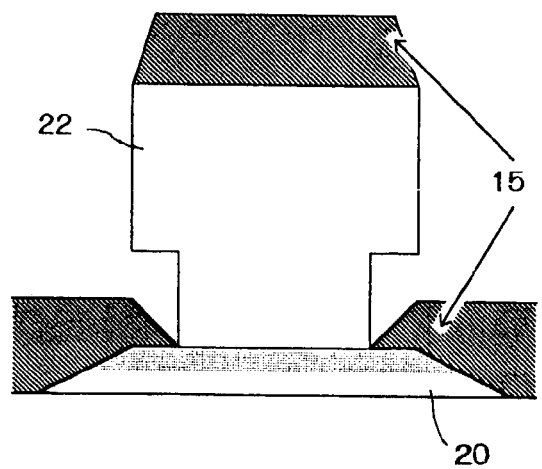
FIG. 7 is an explanation view of the step of forming a antiferromagnetic film.
Figure 8:
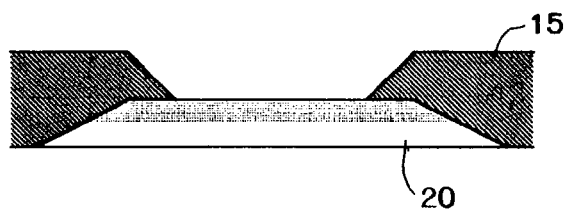
FIG. 8 is an explanation view of the step of removing the resist pattern.

Then, as explained with reference to FIGS. 1–8, the resist pattern 21 is formed by photolithography (see FIG. 2), the spin valve film 20 is formed into trapezoid by ion milling (see FIG. 3), the resist pattern 21 is removed by a resist removing agent (see FIG. 4), another resist pattern 22 is formed by photolithography (see FIG. 5), and the connected part is ion-milled (see FIG. 6). The ion milling is executed under proper conditions so as to remove a part of the protection layer (Au 0.5 nm/NiCr 2 nm/Au 1 nm) of the spin valve film 20 and so as not to remove the NiFe layer. Further, the antiferromagnetic film 15 is formed without taking out the wafer from a vacuum chamber (see FIG. 7), and the resist pattern 22 is removed together with the antiferromagnetic film 15 (see FIG. 8). Then, the wafer is heat-treated in a magnetic field, by a known manner, so as to regularize the antiferromagnetic film 15. The terminal sections 14 made of gold (Au) are formed, and an alumina insulating layer 24, whose thickness is about 0.02 μm, is formed to wholly cover the wafer.

Figure 9:
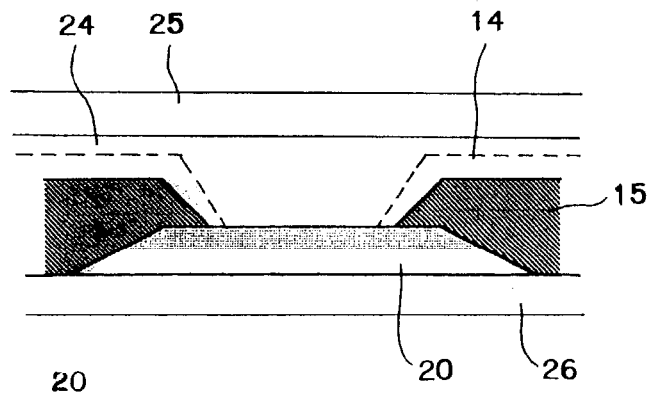
FIG. 9 is an explanation view of the step of forming an insulating layer and an upper shielding layer.

Finally, an upper shielding layer 25, which is made of NiFe and whose thickness is several μm, is formed (see FIG. 9). Note that, a ground layer 26 is shown in FIG. 9.

The plasma cleaning is executed before forming the alumina insulating layer 24. Conditions of the plasma cleaning is properly selected so as to etch and remove the Au 1 nm layer of the protection layer or further etch and remove a part of the NiCr 2 nm layer, which is located under the Au 1 nm layer.

Finally, all of the Au 0.5 nm layer and all or a part of the NiCr 2 nm layer are left. Note that, the plasma cleaning must be executed so as to leave at least the Au 0.5 nm layer (the non-magnetic electric conductive layer having low resistivity).

The wafer is finally cut to form a plurality of elements for spin valve reproducing heads.

The terminal-overlay type elements can be manufactured by the same process, so that the sensing current can be run between the terminal sections only, and reproducing track width of the head can be narrower.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all

What is claimed is:

1. A magnetoresistance effect film comprising a fixed magnetic layer, a non-magnetic layer, and a free magnetic layer piled in that order,
   wherein a non-magnetic electric conductive layer, whose resistivity is lower than that of said free magnetic layer, and an etching stop layer are piled on said free magnetic layer in that order, with said etching stop layer being deposited directly on said non-magnetic electric conductive layer,
   wherein an oxidation resistant layer is directly deposited on said etching stop layer, said oxidation resistant layer comprising; means for preventing oxidation of said etching stop layer, and
   wherein said non-magnetic electric conductive layer is made of copper, silver, gold or an alloy thereof, and said etching stop layer is a metal layer made of aluminum, chrome, cobalt, nickel, iron, ruthenium, platinum or an alloy thereof.

2. A magnetoresistance effect film comprising a fixed magnetic layer, a non-magnetic layer, and a free magnetic layer piled in that order,
   characterized in that a non-magnetic electric conductive layer, whose resistivity is lower than that of said free magnetic layer, an etching stop layer and an oxidation resistant layer, directly deposited on said etching stop layer, for preventing oxidation of said etching stop layer, are piled on said free magnetic layer in that order, with said etching stop layer being deposited directly on said non-magnetic electric conductive layer,
   wherein said non-magnetic electric conductive layer is made of copper, silver, gold or an alloy thereof, and said etching stop layer is a metal layer made of aluminum, chrome, cobalt, nickel, iron, ruthenium, platinum or an alloy thereof, and said oxidation resistant layer is made of gold, silver, platinum, palladium or an alloy thereof.

3. A spin valve reproducing head comprising: a base layer including a lower shielding layer; a magnetoresistance effect film having a magnetic sensing section and being formed on said base layer; biasing sections being formed on both sides of said magnetoresistance effect film; terminal sections for supplying a sensing current to the magnetic sensing section; an insulating layer covering over said magnetoresistance effect film, said biasing sections and said terminal sections; and an upper shielding layer formed on said insulating layer,
   wherein said magnetoresistance effect film includes a fixed magnetic layer, a non-magnetic layer and a free magnetic layer piled in that order,
   a non-magnetic electric conductive layer, whose resistivity is lower than that of said free magnetic layer, and an etching stop layer are piled on said free magnetic layer in that order, with said etching stop layer being deposited directly on said non-magnetic electric conductive layer,
   an oxidation resistant layer, directly deposited on said etching stop layer, including; and
   means for preventing oxidation of said etching stop layer,
   said non-magnetic electric conductive layer is a metal layer made of copper, silver, gold or an alloy thereof, and said etching stop layer is a metal layer made of aluminum, chrome, cobalt, nickel, iron, ruthenium, platinum or an alloy thereof.

* * * * *

UNITED STATES PATENT AND TRADEMARK OFFICE
CERTIFICATE OF CORRECTION

PATENT NO. : 7,008,704 B2
APPLICATION NO. : 10/368749
DATED : March 7, 2006
INVENTOR(S) : Kenji Noma It is certified that error appears in the above-identified patent and that said Letters Patent is hereby corrected as shown below:

<u>Column 7,</u>
Line 16, delete "comprising; means" and insert -- comprising means --.

<u>Column 8,</u>
Line 27, delete "including; and means" and insert -- including means --.

Signed and Sealed this

Twenty-seventh Day of June, 2006

JON W. DUDAS
*Director of the United States Patent and Trademark Office*